United States Patent
Lin et al.

(10) Patent No.: US 7,721,137 B2
(45) Date of Patent: May 18, 2010

(54) BUS RECEIVER AND METHOD OF DESKEWING BUS SIGNALS

(75) Inventors: Ming-Te Lin, Hsin-Tien (TW); Chi Chang, Hsin-Tien (TW)

(73) Assignee: Via Technologies, Inc., Taipei (TW)

( * ) Notice: Subject to any disclaimer, the term of this patent is extended or adjusted under 35 U.S.C. 154(b) by 784 days.

(21) Appl. No.: 11/513,198

(22) Filed: Aug. 31, 2006

(65) Prior Publication Data
US 2007/0074061 A1    Mar. 29, 2007

Related U.S. Application Data

(60) Provisional application No. 60/712,850, filed on Sep. 1, 2005.

(51) Int. Cl.
H03K 4/06    (2006.01)

(52) U.S. Cl. .......................... 713/503; 713/400; 327/3; 327/7; 327/141; 327/144; 327/152; 327/156; 327/163; 375/355

(58) Field of Classification Search ................. 713/400, 713/503; 327/3, 7, 141, 144, 152, 156, 163; 375/355
See application file for complete search history.

(56) References Cited

U.S. PATENT DOCUMENTS

| 5,646,519 | A | * | 7/1997 | Hamilton et al. ......... 324/76.82 |
| 6,044,121 | A | | 3/2000 | Nolan et al. |
| 2002/0186717 | A1 | | 12/2002 | Haq et al. |

FOREIGN PATENT DOCUMENTS

| JP | 63-9246 B2 | 2/1988 |
| TW | 439033 | 6/2001 |

* cited by examiner

*Primary Examiner*—Abdelmoniem Elamin
(74) *Attorney, Agent, or Firm*—Birch, Stewart, Kolasch & Birch, LLP

(57) ABSTRACT

A bus receiver receives at least one first signal and a second signal both generated from a chip connected to a parallel bus. The bus receiver includes a receiving module and a deskewing module. The receiving module is electrically connected to the parallel bus and receives the first signal and the second signal transmitted through the parallel bus. The deskewing module is electrically connected to the receiving module and deskews the phase of the first signal and the phase of the second signal. The first signal and the second signal are in the same phase.

29 Claims, 12 Drawing Sheets

US 7,721,137 B2

BUS RECEIVER AND METHOD OF DESKEWING BUS SIGNALS

This application claims the benefit of U.S. Provisional Application Ser. No. 60/712,850, entitled "RECEIVER FOR PARALLEL BUS", filed Sep. 1, 2005.

BACKGROUND OF THE INVENTION

1. Field of Invention

The application relates to a receiver and, in particular, to a receiver for a parallel bus.

2. Related Art

With development of the integrated circuit, the processing speed for data bits of the processor may also be promoted. Thus, in order to maintain the whole system at the best performance, transmission bit rate between other element and the integrated circuit is required to promote and match up to the processor for achieving the best performance.

Please refer to FIG. 1, a PCB (printed circuit board) 1 including a parallel bus 11 and two integrated circuits 12, 13 is shown. The parallel bus 11 is electrically connected between the integrated circuit 12 and the integrated circuit 13. The integrated circuit 12 receives a plurality of data signals 131 and a clock signal 132 delivered from the integrated circuit 13 through the parallel bus 11. In this case, the parallel bus 11 may be a memory bus, and the integrated circuit 13 may be a DDR-SDRAM or a SDRAM. The integrated circuit 12 may be a system chipset, which connects with other device such as CPU, graphic card, or I/O bus.

The data signals 131 and the clock signal 132 are designated to be synchronous or to arrive to the integrated circuit 12 at the same time, however, a signal skew may be caused when the data signals 131 are transmitted through the parallel bus 11 via mismatch transmission path, and therefore it results in low system performance. The signal skew may be caused by the following issues: a length discrepancy between signal lines of the parallel bus 11, a length discrepancy between signal lines of the integrated circuit 12 or 13, a different package bond (or bump) location of the integrated circuit 12 or 13, a path length mismatch package substrate layout mismatch, etc.

In the conventional technology, signal lines on PCB 1 have the uniform layouts, so that integrated circuit 12 and 13 resulting in less mismatch between data signals. However, it is required that the PCB 1, the integrated circuit 12 and 13 have well layout to avoid a discrepancy between transmission paths of the signal lines.

It is therefore to reduce the skew amount between the data signals in the receiver, so as to adapt the receiver to the transmission path discrepancy of signals lines resulting from the layout of the mother board or the package board becomes important.

SUMMARY OF THE INVENTION

A receiver for a parallel bus and a phase synchronizing method for the parallel bus which can reduce the timing discrepancy between the data signals transmitted through the parallel bus is provided.

A bus receiver receives at least one first signal and a second signal both generated from a chip connected to a parallel bus. The bus receiver includes a receiving module and a deskewing module. The receiving module is electrically connected to the parallel bus and receives the first signal and the second signal transmitted through the parallel bus. The deskewing module is electrically connected to the receiving module and deskews the phase of the first signal and the phase of the second signal. The first signal and the second signal are in the same phase.

A method of deskewing bus signals, which is for at least one first signal and a second signal to be in the same phase both generated from an integrated circuit connected to a parallel bus, including the following steps: comparing the phases of the first signal and the second signal to enable a first phase skew signal or a second phase skew signal; and adjusting a delay time for transmitting the first signal and the second signal in response to the first phase skew signal or the second phase skew signal.

As mentioned above, the receiver and method deskewing bus signals of the invention compare the phase between the first signal and the second signal to adjust them, such that the phases of the first signal and the second signal are close to each other. Therefore, a skew amount between the first signal and the second signal is reduced, and transmission rate and performance of the receiver are improved.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The application will be described below with reference to relevant drawings, wherein the same elements are referred with the same reference numbers.

Figure 1:
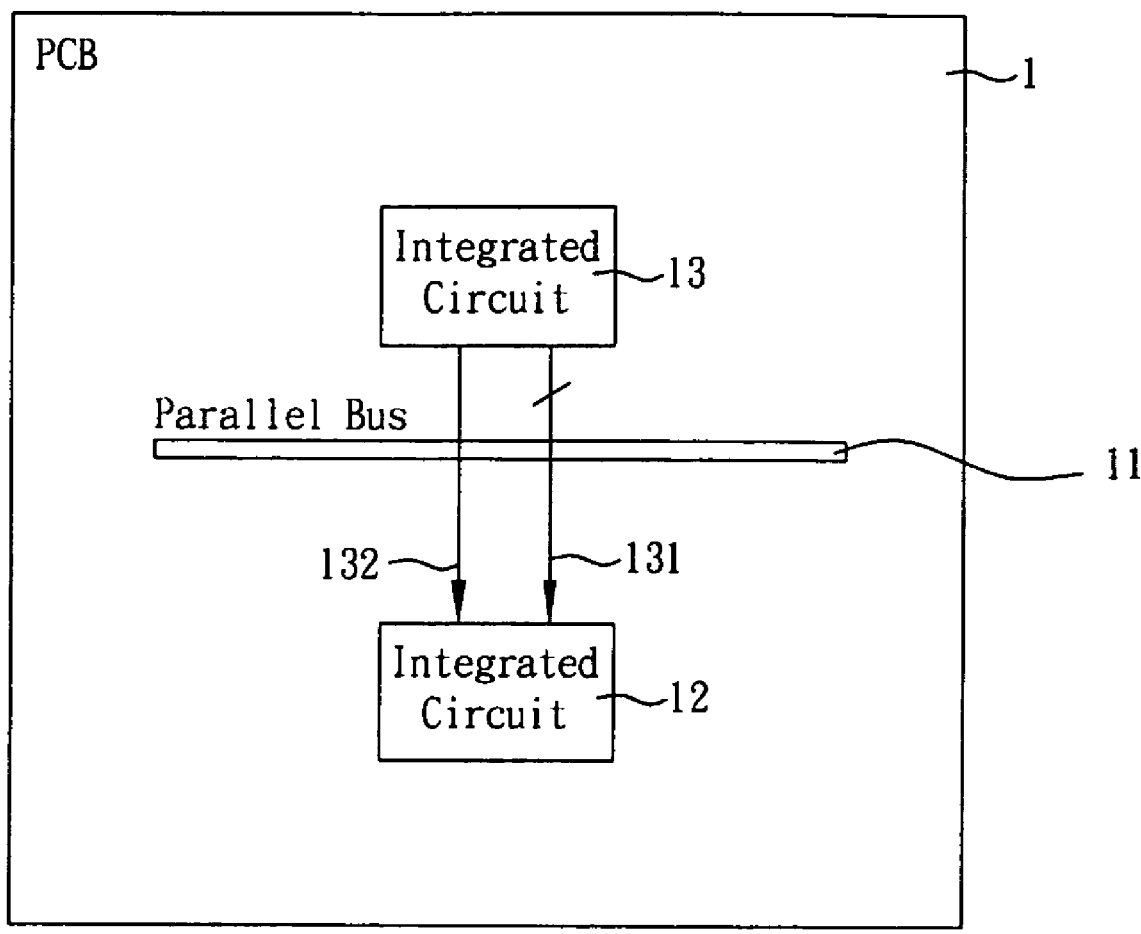
FIG. 1 is a block diagram showing the conventional printed circuit board.
Figure 2:
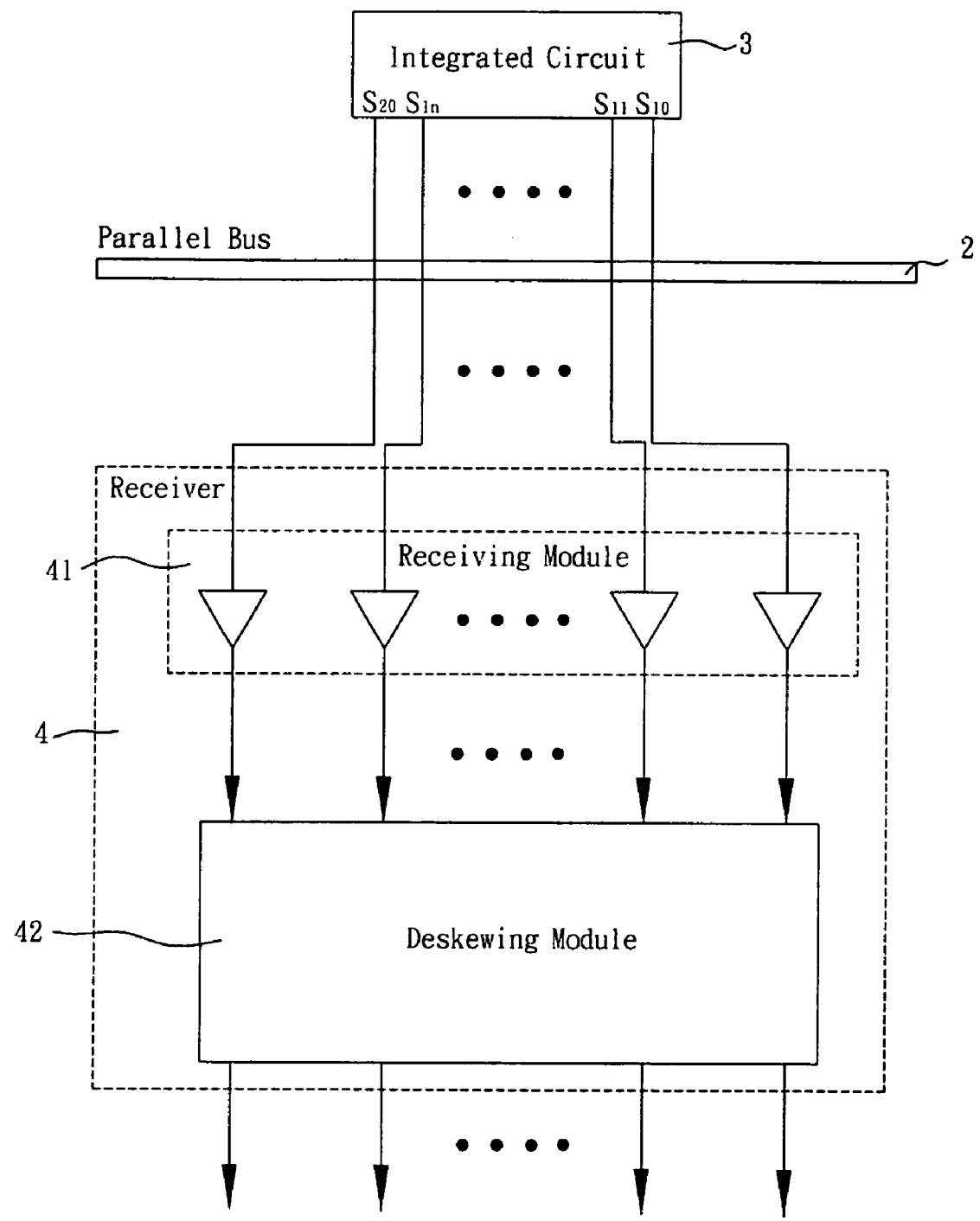
FIG. 2 is a block diagram showing a receiver for a parallel bus according to an embodiment of the invention.

Please refer to FIG. 2, a receiver 4 according to one embodiment of the invention is electrically connected to one terminal of a parallel bus 2. Another terminal of the parallel bus 2 is electrically connected to an integrated circuit 3.

Herein, the integrated circuit 3 generates a plurality of first signals $S_{10}$-$S_{1n}$ and a second signal $S_{20}$.

The receiver 4 includes a receiving module 41 and a deskewing module 42. The receiving module 41 is electrically connected to the parallel bus 2, and receives the first signals $S_{10}$-$S_{1n}$ and the second signal $S_{20}$ transmitted through the parallel bus 2 from the integrated circuit 3. The deskewing module 42 is electrically connected to the receiving module 41 to receive the first signals $S_{10}$-$S_{1n}$ and the second signal $S_{20}$ respectively, and then adjusts the phase of the first signals $S_{10}$-$S_{1n}$ and the second signal $S_{20}$ to synchronize the first signals $S_{10}$-$S_{1n}$ and the second signal $S_{20}$.

The second signal $S_{20}$ can be a data signal or a clock signal. The first signals $S_{10}$-$S_{1n}$ can be data signals. If the first signals $S_{10}$-$S_{1n}$ and the second signal $S_{20}$ are transmitted from the integrated circuit 3 synchronously but arrive at the receiving module 41 asynchronously, the deskewing module 42 may adjust the phase of the first signals $S_{10}$-$S_{1n}$ and the second signal $S_{20}$ to synchronize the first signals $S_{10}$-$S_{1n}$ and the second signal $S_{20}$.

Figure 3:
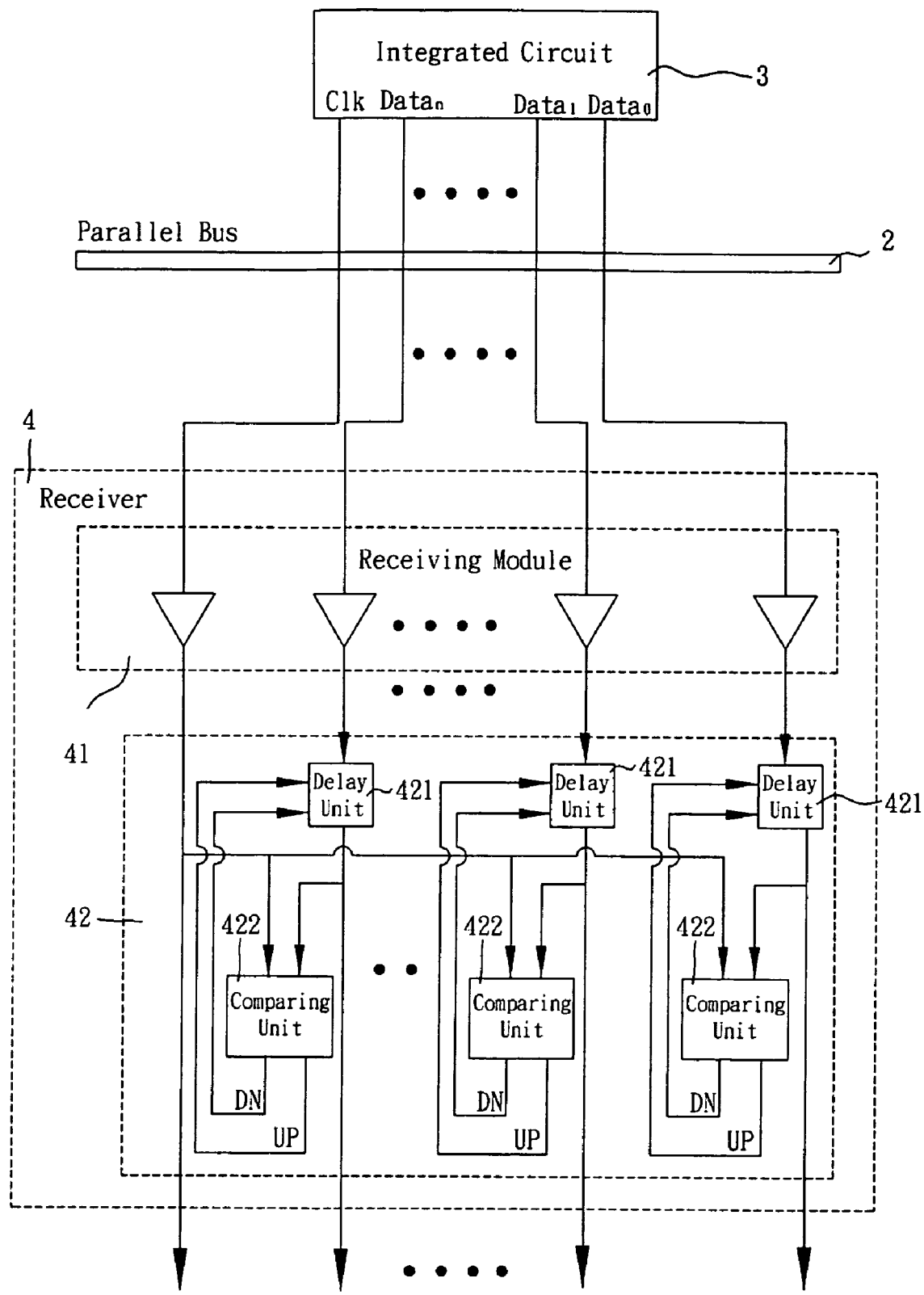
FIG. 3 is another block diagram showing the receiver for the parallel bus according to the embodiment of the invention.

Please referring to FIG. 3, the first signals $S_{10}$-$S_{1n}$ and second signal $S_{20}$ are illustrated as data signals $Data_0$-$Data_n$ and clock signal Clk respectively in the following explanation.

The deskewing module 42 is electrically connected to the receiving module 41 to receive the data signals $Data_0$-$Data_n$ and the clock signals Clk. The deskewing module 42 includes a plurality of delay units 421 and a plurality of comparing units 422. In the following description about signal deskewing process, the data signal $DATA_n$ is illustrated below for an example, and other data signals have the same signal deskewing process as the data signal $DATA_n$. Delay unit 421 is electrically connected to the receiving module 41 to receive the data signal $DATA_n$. The comparing unit 422 can be implemented as a phase detector, and is electrically connected to the delay unit 421 and the receiving module 41 respectively to receive the data signal $DATA_n$ and clock signal Clk. The comparing unit 422 compares the phase difference between the data signal $DATA_n$ and the clock signal Clk.

In the embodiment, when the data signal $DATA_n$ falls behind the clock signal Clk, the comparing unit 422 enables a first phase skew signal UP. If the data signal $DATA_n$ is seriously behind the clock signal Clk, the comparing unit 422 uninterruptedly enables the first phase skew signal UP within a continuous of clock timing. On the contrary, when the data signal $DATA_n$ is ahead of the clock signal Clk, the comparing unit 422 enables a second phase skew signal DN. If the data signal $DATA_n$ is seriously ahead the clock signal Clk, the comparing unit 422 uninterrupted enables the second phase skew signal DN within a continuous of clock timing.

The delay unit 421 receives the first phase skew signal UP and the second phase skew signal DN. It decreases a delay time for transmitting the data signal $DATA_n$ when the first phase skew signal UP is enabled, or it increases the delay time for transmitting the data signal $DATA_n$ when the second phase skew signal DN is enabled. Thus, the delay time for transmitting the data signal $DATA_n$ is controlled, and the data signal $DATA_n$ and the clock signal Clk are synchronous.

Figure 4:
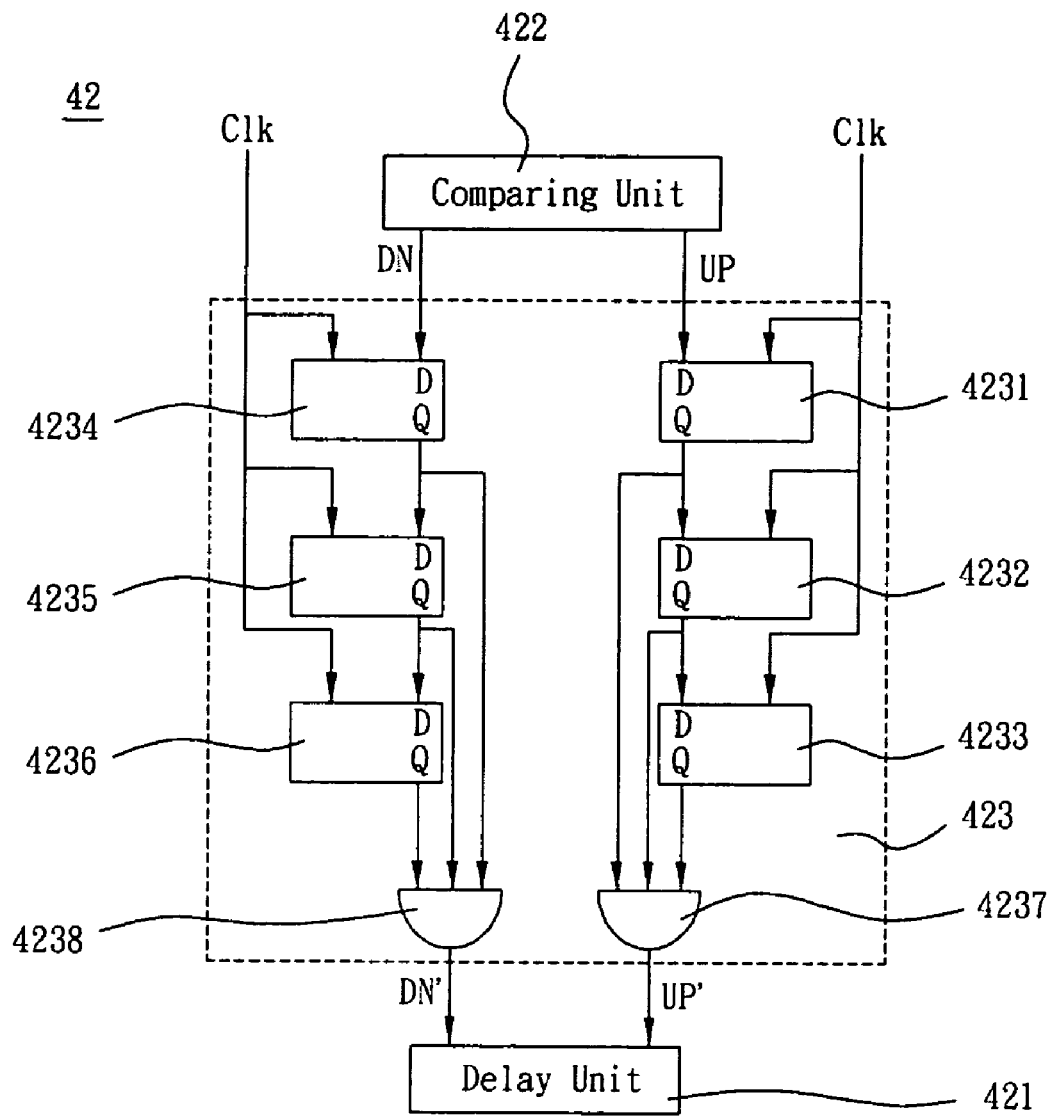
FIG. 4 is a schematic diagram showing a filter unit and a phase skew signal in the receiver for the parallel bus according to the embodiment of the invention.
Figure 4:
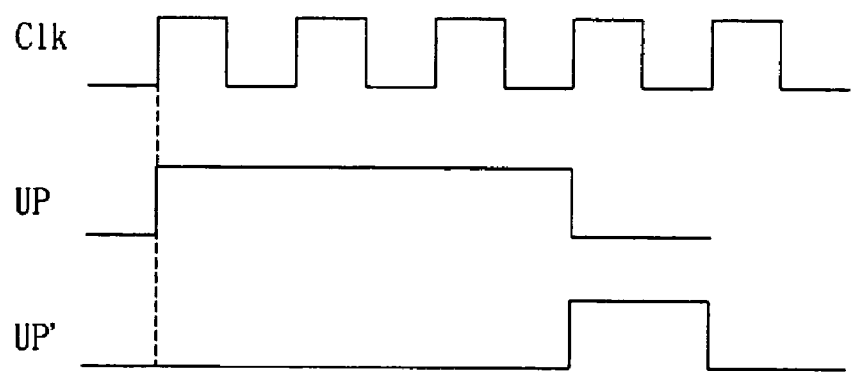

In addition, referring to FIG. 4, the deskewing module 42 further includes a filter unit 423. The filter unit 423 is electrically connected between the comparing unit 422 and the delay unit 421. In the embodiment, the filter unit 423 includes six D Flip Flops 4231-4236 and two AND gates 4237-4238. The D Flip Flops 4231-4233 and the AND gate 4237 is configured to process the first phase skew signal UP. The D Flip Flops 4234-4236 and the AND gate 4238 are configured to process the second phase skew signal DN.

When the first phase skew signal UP or the second phase skew signal DN is continuously enabled at least three cycles of the clock time, a third phase skew signal UP' or a fourth phase skew signal DN' is enabled and outputted to the delay unit 421. Then, the delay unit 421 adjusts the delay time of the data signal $DATA_n$ in response to the third phase skew signal UP' and the fourth phase skew signal DN'. Therefore, the delay unit 421 avoids sensitively adjusting the delay time of the data signal $DATA_n$ according the first phase skew signal UP or the second phase skew signal DN. In addition, the amount of the D Flip Flops in the filter unit 423 is illustrated as six but is not limited to six.

Figure 5:
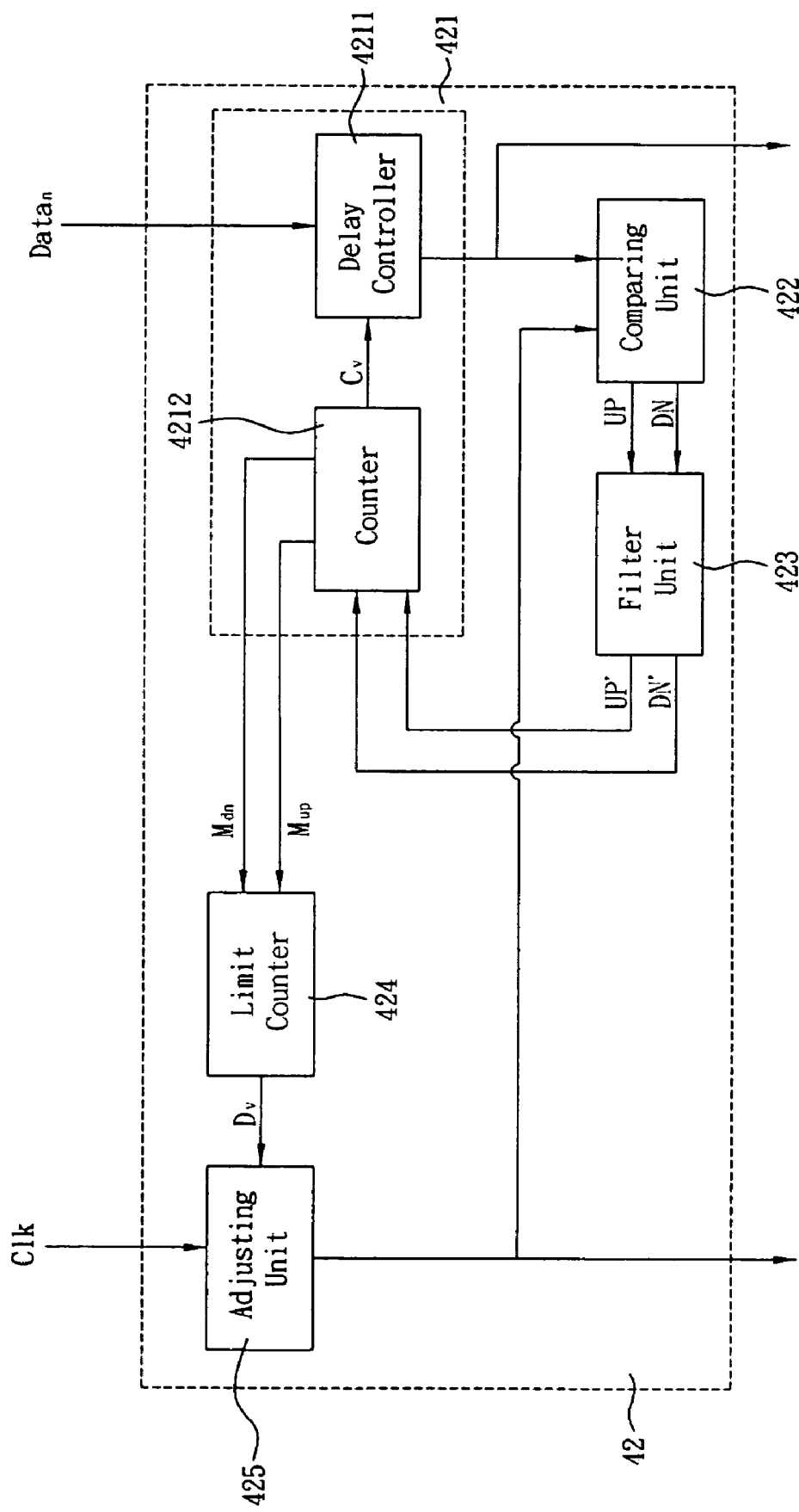
FIG. 5 is a block diagram showing the deskewing module in the receiver for the parallel bus according to the embodiment of the invention.

Referring to FIG. 5, in the embodiment, the deskewing module 42 further includes a limit counter 424 and an adjusting unit 425. The delay unit 421 includes a delay controller 4211 and a counter 4212.

The counter 4212 is electrically connected to the filter unit 423 to receive the third phase skew signal UP' and the fourth phase skew signal DN'. It counts enabled times of the third phase skew signal UP' and the fourth phase skew signal DN', and stores the enabled times in a count value $C_v$. The delay controller 4211 is electrically connected to the counter 4212 and the receiving module 41 to receive the count value $C_v$ and the data signal $Data_n$ respectively. It controls the delay time for transmitting the data signal $Data_n$ in order to synchronize the data signal $Data_n$ with the clock signal Clk.

In the embodiment, the range of the count value $C_v$ is between 0 and 7. The counter 4212 decreases the count value $C_v$ with 1 when the third phase skew signal UP' is enabled. If the count value $C_v$ is 0, the count value $C_v$ remains being 0 after decreasing. Similarly, the counter 4212 increases the count value $C_v$ with 1 when the fourth phase skew signal DN' is enabled. If the $C_v$ is 7, the count value $C_v$ remains being 7 after increasing. Therefore the count value $C_v$ responses the skew amount between the data signal $Data_n$ and the clock signal Clk.

For example, when the count value $C_v$ is 7, the delay controller 4211 delays transmitting the data signal $Data_n$ for 7 unit time periods. When the count value $C_v$ is 1, the delay controller 4211 delays transmitting the data signal $Data_n$ for 1 unit time period. The unit cycle is shorter than the cycle of the clock signal Clk. If the unit time period is shorter, the resolution of the delay time is higher.

Figure 6:
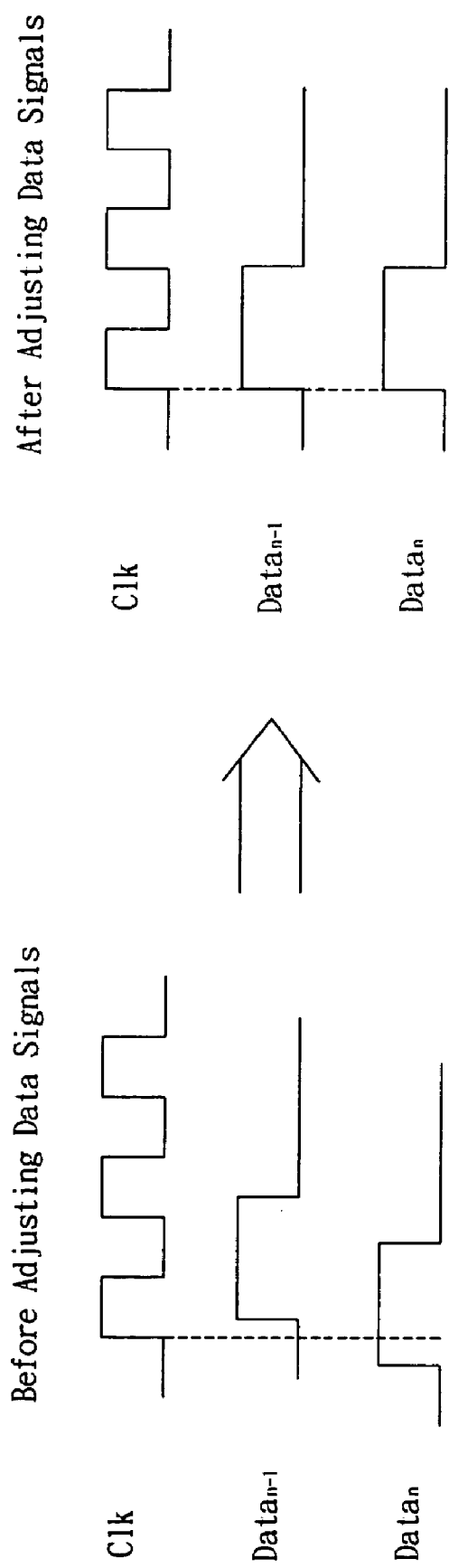
FIG. 6 is a schematic diagram showing the deskewed signals in the receiver for the parallel bus according to the embodiment of the invention.

Referring to FIG. 6, the data signal $Data_{n-1}$ falls behind the clock signal Clk, and the data signal $Data_n$ is ahead of the clock signal Clk. After applying with the process described above, the corresponding delay controller 4211 decreases the delay time of the data signal $Data_{n-1}$, and another corresponding delay controller 4211 increases the delay time of the data signal $Data_n$ respectively. Thus the skew amount between data signals $Data_{n-1}$, $Data_n$ and the clock signal Clk is reduced, and these signals are synchronous.

Please referring to FIG. 5 again, when the count value $C_v$ of the counter 4212 reaches its limit (ex: 0 or 7), the adjustable range of the delay controller 4211 also reaches its limit. Thus the delay controller 4211 is not able to adjust the data signal $Data_n$ faster or slower. At this moment, the counter 4212 enables a first deskew limit signal $M_{up}$ when the count value $C_v$ is 0, or enables a second deskew limit signal $M_{dn}$ when the count value $C_v$ is 7.

The limit counter 424 is electrically connected to the counter 4212 to receive the first deskew limit signal $M_{up}$ and the second deskew limit signal $M_{dn}$ to generate a delay value $D_v$. In the embodiment, the limit counter 424 counts and stores the enabled times of the first deskew limit signal $M_{up}$ and the second deskew limit signal $M_{dn}$ in the delay value $D_v$. When the first deskew limit signal $M_{up}$ is enabled, the delay value $D_v$ is increased with 1. When the second deskew limit signal $M_{dn}$ is enabled, the delay value $D_v$ is decreased with 1. The range of the delay value $D_v$ is between 0 and 7.

The adjusting unit 425 is electrically connected to the receiving module 41 and the limit counter 424 respectively to receive the clock signal Clk and the delay value $D_v$. The adjusting unit 425 controls the delay time for transmitting the clock signal Clk in response to the delay value $D_v$, and further adjusts the phase of the clock signal Clk close to the phase of the data signal $Data_n$. Therefore, the data signal $Data_n$ and the clock signal Clk are easier to synchronize.

For example, when the delay value $D_v$ is 7, the adjusting unit 425 delays transmitting the clock signal Clk for 7 unit time periods. When the delay value $D_v$ is 1, the adjusting unit 425 delays transmitting the clock signal Clk for 1 unit time period.

Figure 7:
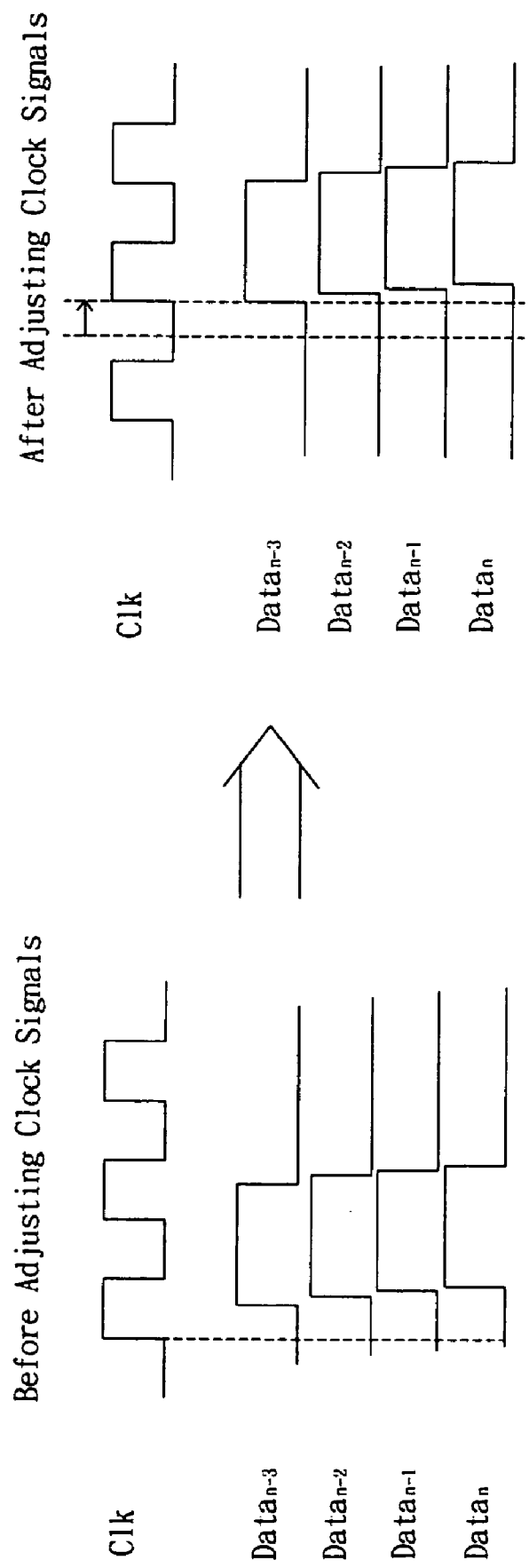
FIG. 7 is another schematic diagram showing the deskewed signals in the receiver for the parallel bus according to the embodiment of the invention.

Referring to FIG. 7, the data signals $Data_3$-$Data_n$ are close to each other in phase. After applying the process described above, the adjusting unit 425 increases the delay time of the clock signal Clk. Therefore, the skew amount between data signals $Data_3$-$Data_n$ and the clock signal Clk is reduced so that these signals are synchronous.

If most signals are close to each other in phase and only the clock signal is far away from the data signals in phase, the phase of the clock signal is adjusted first because the skew amount between the data signals is smaller than the skew amount between the clock signal and the data signal. It is more effective to reduce the skew amount between the clock signal and the data signal for synchronizing these signals.

Figure 8:
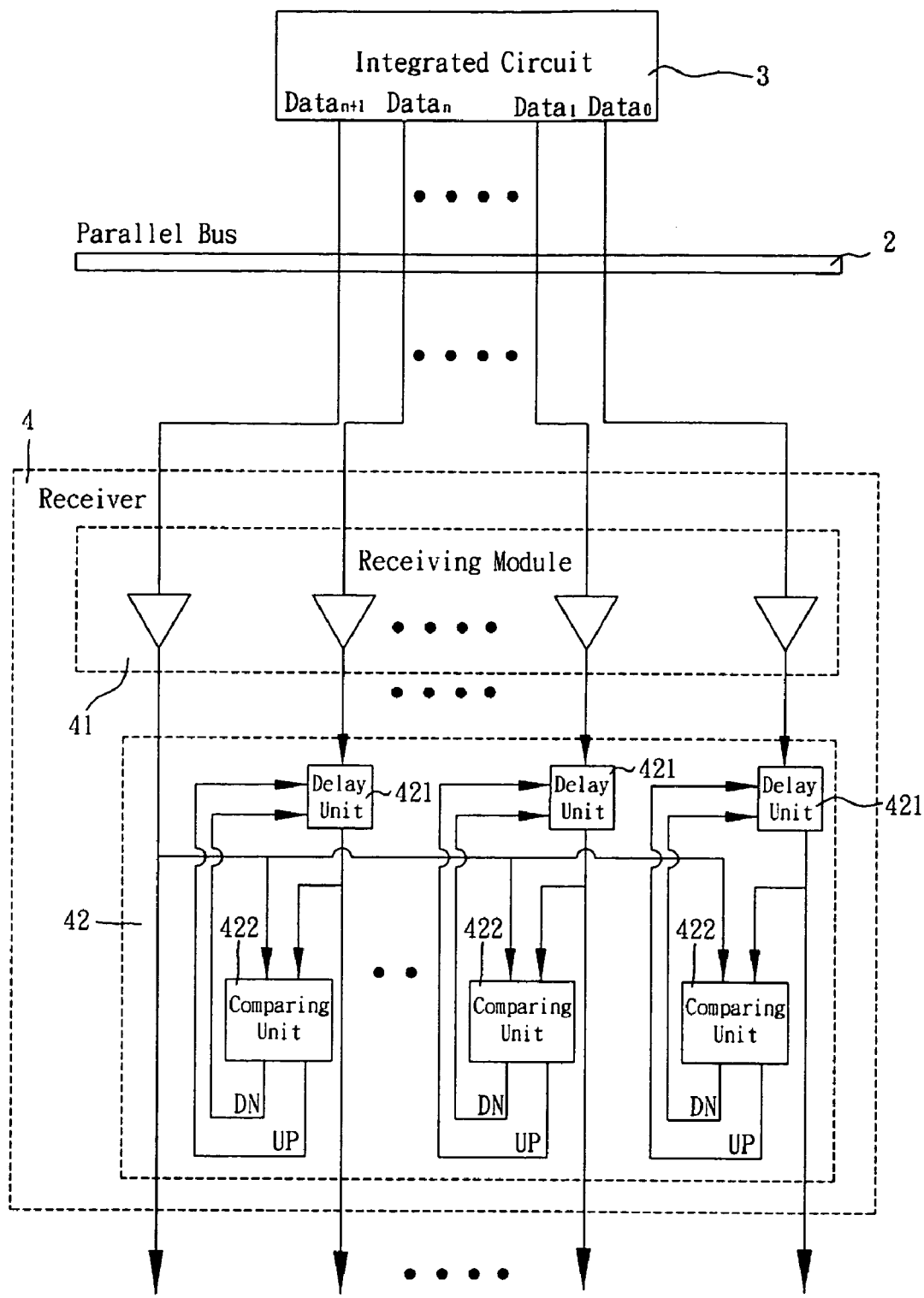
FIG. 8 is a block diagram showing a receiver for a parallel bus according to another embodiment of the invention.
Figure 9:
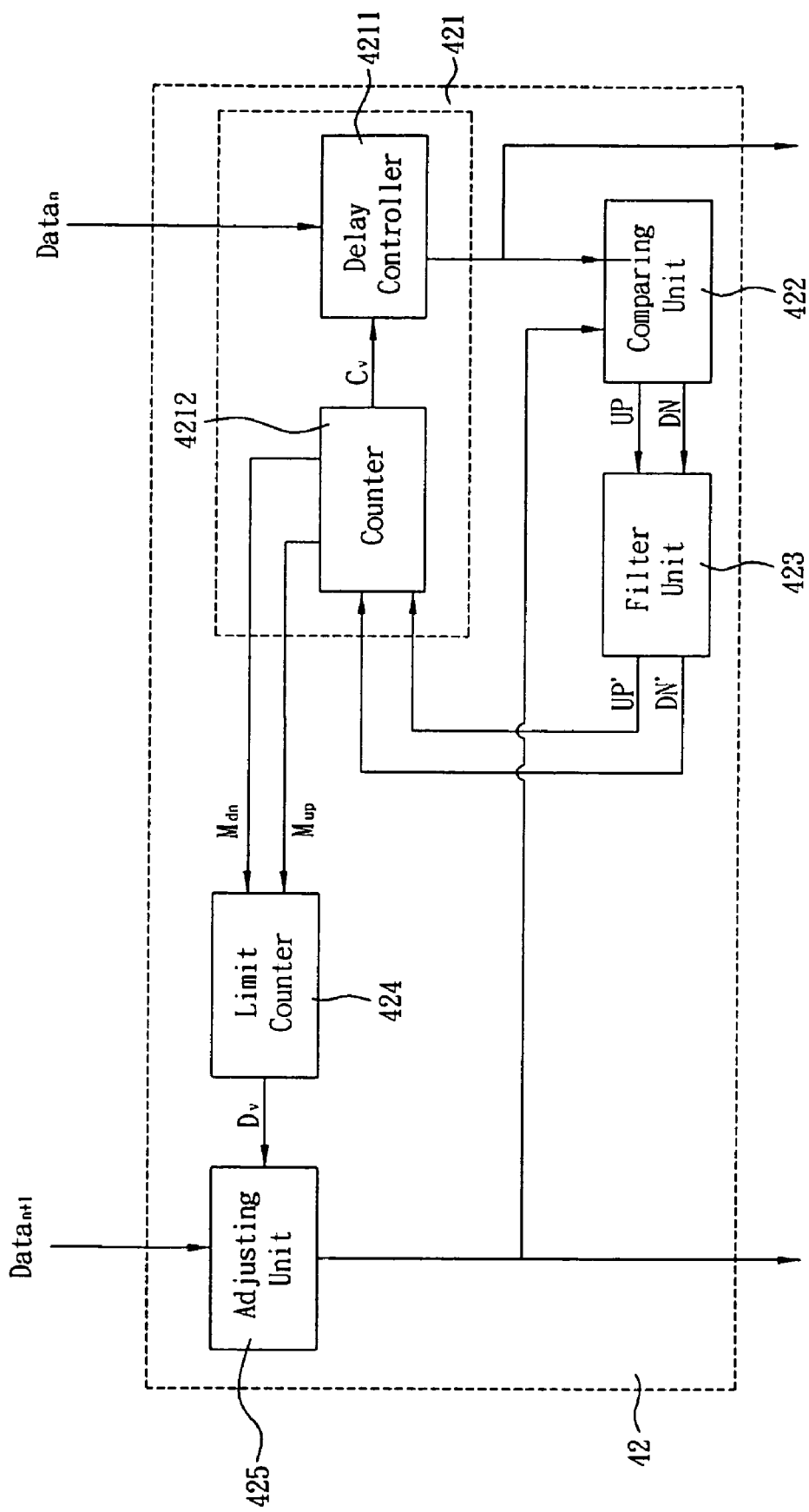
FIG. 9 is a block diagram showing the deskewing module in the receiver for the parallel bus according to another embodiment of the invention.

Referring to FIGS. 8 and 9. In difference with the above embodiment, the second signal $S_{20}$ is a data signal $Data_{n+1}$. The elements in this embodiment and those in the above embodiments which are marked with the same symbols or numbers, have the same function and result, thus the detailed descriptions are omitted here.

Figure 10:
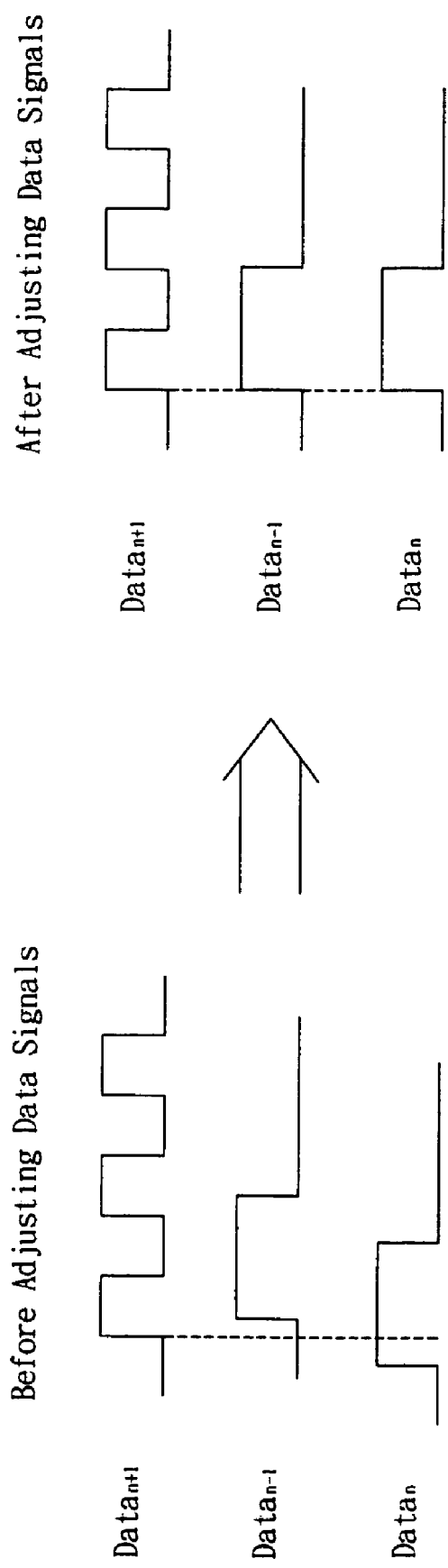
FIG. 10 is a schematic diagram showing the deskewed signals in the receiver for the parallel bus according to another embodiment of the invention.

Referring to FIG. 10, the data signal $Data_{n-1}$ falls behind the data signal $Data_{n+1}$, and the data signal $Data_n$ is ahead of the data signal $Data_{n+1}$. After applying with the process described above, the corresponding delay controller 4211 decreases the delay time of the data signal $Data_{n-1}$, and another corresponding delay controller 4211 increases the delay time of the data signal $Data_n$, respectively. Thus, the skew amount between data signals $Data_{n-1}$, $Data_n$ and $Data_n$ is reduced, so that these signals are synchronous.

Figure 11:
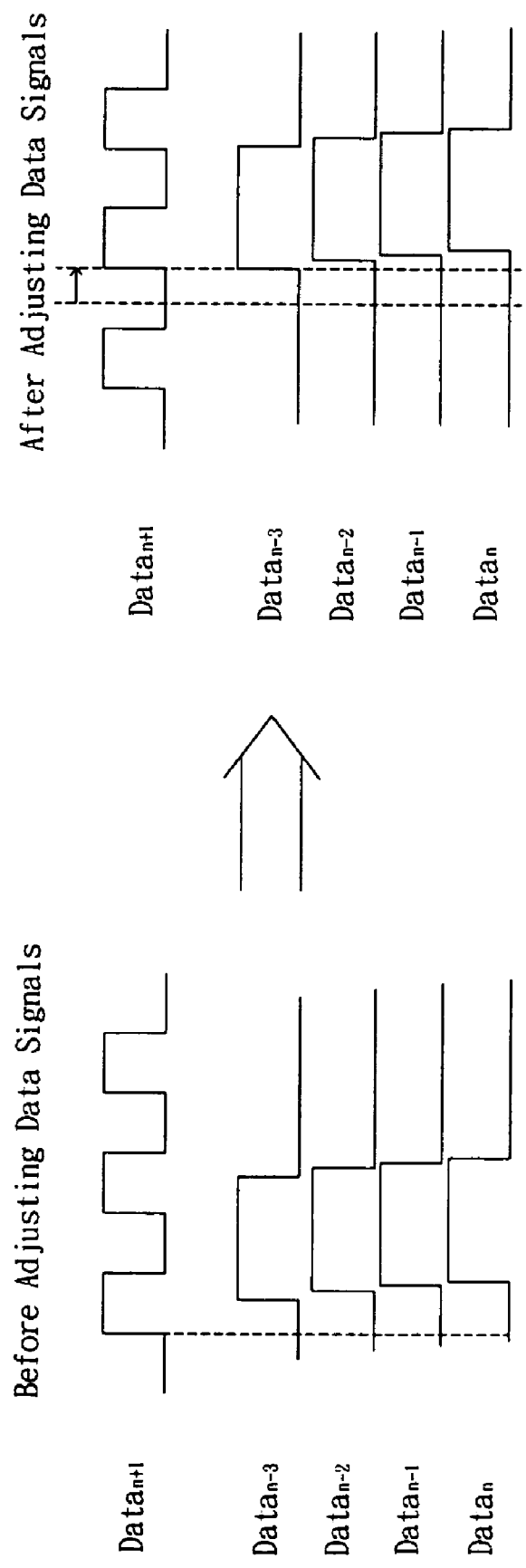
FIG. 11 is another schematic diagram showing the deskewed signals in the receiver for the parallel bus according to another embodiment of the invention.

In addition, referring to FIG. 11, the data signals $Data_{n-3}$-$Data_n$ are close to each other in phase, and fall behind the data signal $Data_{n+1}$ distantly. After applying the process described above, the adjusting unit 425 increases the delay time of the data signal $Data_{n+1}$. Thus, the skew amount between data signals $Data_{n-3}$-$Data_{n+1}$ is reduced, so that these signals are synchronous.

If most signals are close to each other in phase and only one data signal is far away from the other data signals in phase, the phase of the lonely data signal is adjusted first. It is more effective to reduce the skew amount between the lonely data signal and the other data signals for synchronizing these signals.

The receiver 4 not only adjusts the skew amount of the data signal referring to the clock signal, but also adjusts the skew amount of the data signals referring to one data signal. In addition, the receiver 4 can adjust the clock signal regarding as a reference signal for synchronizing the data signals and the reference signal more easily, it can adjust the data signal regarding as another reference signal for synchronizing the data signals more easily, too.

In the above embodiment, the receiver 4 is implemented with a receiver in a chipset on a motherboard, the integrated circuit 3 is implemented with a memory or other function integrated circuit such as chipset on the motherboard. The parallel bus 2 is implemented with a memory bus, a high-speed bus between chipsets or between a processor and a chipset.

Besides, the receiver 4 adjusts the delay time of the deskewing module 42 when initialing a communication with the integrated circuit 3 and until the deskewing module 42 output signals synchronously. After the receiver 4 initials the communication with the integrated circuit 3, the delay time of the deskewing module 42 is configured, thus the deskewing module 42 output signals synchronously and the skew amount between the signals is reduced.

Figure 12:
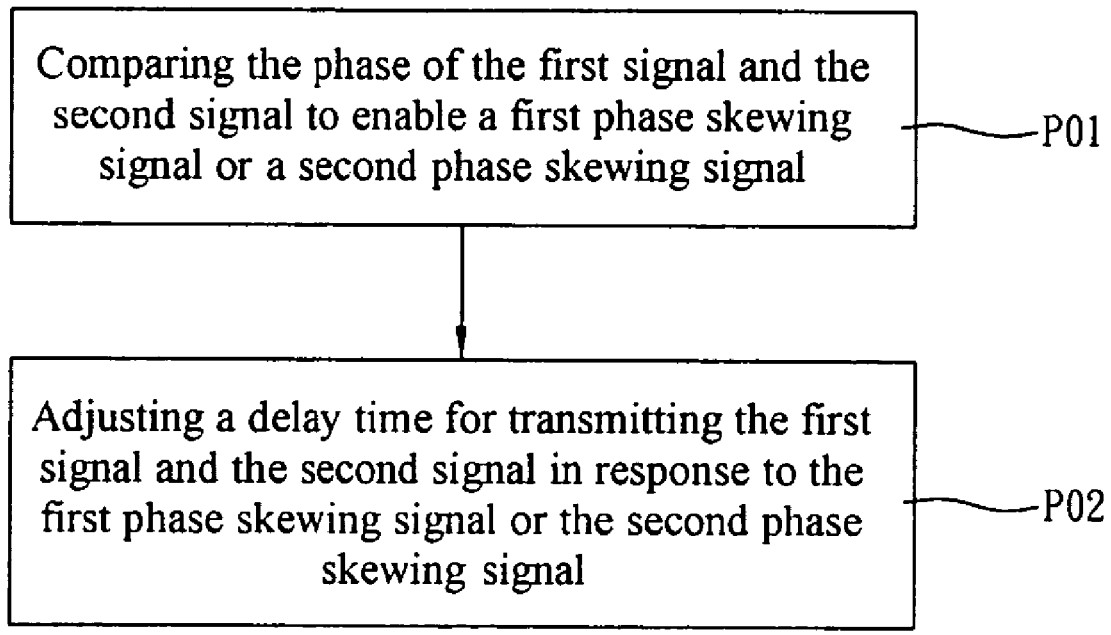
FIG. 12 is flow chart showing a signal deskewing method for a parallel bus according to the embodiment of the application.

Referring to FIG. 12, a method of deskewing bus signals according to the embodiment of the invention is for an integrated circuit connected to a parallel bus and such that at least one first signal and a second signal, which are outputted from the integrated circuit and transmitted through the parallel bus, are synchronous. The method includes the following steps P01 and P02. The step P01 compares the phase of the first signal and the second signal to enable a first phase skewing signal or a second phase skewing signal. The step P02 adjusts a delay time for transmitting the first signal and the second signal in response to the first phase skewing signal or the second phase skewing signal.

The method of deskewing bus signals in the embodiment can be applied to the receiver as mentioned in the above embodiment as shown in FIG. 2 to FIG. 11. Thus, the method of deskewing bus signals of this embodiment can be realized with referring to the previous embodiment, and the detailed descriptions are omitted here.

As mentioned above, the receiver and method deskewing bus signals of the invention compare the phase between the first signal and the second signal to adjust them, such that the phases of the first signal and the second signal are close to each other. Therefore, a skew amount between the first signal and the second signal is reduced, so that transmission rate and performance of the receiver are improved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A bus receiver, for receiving at least one first signal and a second signal both generated from an integrated circuit connected to a parallel bus, comprising:

a receiving module electrically connected to the parallel bus to receive the first signal and the second signal transmitted through the parallel bus; and a deskewing module electrically connected to the receiving module to deskew the phases of the first signal and the phase of the second signal such that the first signal and the second signal are in the same phase, wherein the deskewing module comprises:

at least one delay unit electrically connected to the receiving module; and at least one comparing unit for comparing the phases of the first signal and the second signal;

wherein a first phase skew signal or a second phase skew signal is enabled and outputted to the delay unit in response to the compare, and the delay unit decreases or increases a delay time for transmitting the first signal in response to the first phase skew signal or the second phase skew signal such that the first signal and the second signal are synchronous in phase.

2. The bus receiver according to claim 1, wherein the comparing unit enables the first phase skew signal to decrease the delay time for transmitting the first signal if the first signal falls behind the second signal, and the comparing unit enables the second phase skew signal to increase the delay time for transmitting the first signal if the first signal is ahead of the second signal.

3. The bus receiver according to claim 2, wherein the comparing unit uninterruptedly enables the first phase skew signal within a continuous clock timing if the first signal seriously falls behind the second signal, and the comparing unit uninterruptedly enables the second phase skew signal within a continuous clock timing if the first signal is seriously ahead of the second signal.

4. The bus receiver according to claim 1, wherein the comparing unit is a phase detector.

5. The bus receiver according to claim 1, wherein the deskewing module further comprises:
at least one filter unit electrically connected between the delay unit and the comparing unit enables a third phase skew signal or a fourth phase skew signal if the first phase skew signal or the second phase skew signal is continuously enabled.

6. The bus receiver according to claim 5, wherein the filter unit comprises a plurality of D Flip Flops in series and a plurality of AND gates connected to the D Flip Flops.

7. The bus receiver according to claim 5, wherein the delay unit further comprises:
a counter electrically connected to the filter unit to receive the third phase skew signal and the fourth phase skew signal, wherein the counter has a count value decreased or increased in response to the third phase skew signal and the fourth phase skew signal; and
a delay controller electrically connected to the counter and the receiving module to control the delay time for transmitting the first signal in response to the count value.

8. The bus receiver according to claim 7, wherein the count value is decreased by 1 if the third phase skew signal is enabled, and the count value is increased by 1 if the fourth phase skew signal is enabled.

9. The bus receiver according to claim 8, wherein the count value has a predetermined counting range, if the count value reaches a minimum of the predetermined counting range and the third phase skew signal is enabled, the count value is not decreased by 1, if the count value reaches a maximum of the predetermined counting range and the forth phase skew signal is enabled, the count value is not increased by 1.

10. The bus receiver according to claim 9, wherein the predetermined counting range is from 0 to 7.

11. The bus receiver according to claim 9, wherein the counter enable a first deskew limit signal if the count value reaches the minimum of the predetermined counting range, and the counter enable a second deskew limit signal if the count value reaches the maximum of the predetermined counting range.

12. The bus receiver according to claim 11, wherein the deskew module further comprises:
a limit counter electrically connected to the counter to receive the first deskew limit signal and the second deskew limit signal, wherein the limit counter has a delay value which is increased by 1 if the first deskew limit signal is enabled or decreased by 1 if the second deskew limit signal is enabled; and an adjusting unit electrically connected to the limit counter and the receiving module to control the delay time for transmitting the second signal in response to the delay value.

13. The bus receiver according to claim 12, wherein the range of the delay value is from 0 to 7.

14. The bus receiver according to claim 1, wherein the first signal is a data signal and the second signal is a clock signal.

15. The bus receiver according to claim 1, wherein the first signal and the second signal are data signals.

16. The bus receiver according to claim 1, wherein the bus is a memory bus, and the integrated circuit is a chipset.

17. A method of deskewing bus signals, which is for at least one first signal and a second signal to be in the same phase both generated from an integrated circuit connected to a parallel bus, comprising:
comparing the phases of the first signal and the second signal to enable a first phase skew signal or a second phase skew signal; and
adjusting a delay time for transmitting the first signal and the second signal in response to the first phase skew signal or the second phase skew signal,
wherein the first phase skew signal is enabled to decrease the delay time for transmitting the first signal if the first signal falls behind the second signal, and the second phase skew signal is enabled to increase the delay time for transmitting the first signal if the first signal is ahead of the second signal.

18. The method according to claim 17, wherein the first phase skew signal is uninterruptedly enabled within a continuous clock timing if the first signal seriously falls behind the second signal, and the second phase skew signal is uninterruptedly enabled within a continuous clock timing if the first signal is seriously ahead of the second signal.

19. The method according to claim 17, further comprises:
enabling a third phase skew signal if the first phase skew signal is continuously enabled; and
enabling a forth phase skew signal if the second phase skew signal is continuously enabled.

20. The method according to claim 19, further comprises:
counting a count value in response to the enabled times of the third phase skew signal and the forth phase skew signal; and
adjusting the delay time for transmitting the first signal in response to the count value.

21. The method according to claim 20, wherein the count value is decreased by 1 if the third phase skew signal is enabled, and the count value is increased by 1 if the forth phase skew signal is enabled.

22. The method according to claim 21, wherein the count value has a predetermined counting range, if the count value reaches a minimum of the predetermined counting range and the third phase skew signal is enabled, the count value is not decreased, if the count value reaches a maximum of the predetermined counting range and the forth phase skew signal is enabled, the count value is not increased.

23. The method according to claim 22, wherein the predetermined counting range is from 0 to 7.

24. The method according to claim 22, further comprising:
enabling a first deskew limit signal if the count value reaches the minimum of the predetermined counting range; and enabling a second deskew limit signal if the count value reaches the maximum of the predetermined counting range.

25. The method according to claim 24, further comprises:
counting a delay value in response to the enabled times of the first deskew limit signal and the second first deskew limit signal; and
adjusting the delay time for transmitting the first signal in response to the delay value.

26. The method according to claim 25, wherein the delay value is increased by 1 if the first deskew limit signal is enabled, and the delay value is decreased by 1 if the second deskew limit signal is enabled.

27. The method according to claim 25, wherein the range of the delay value is from 0 to 7.

28. The method according to claim 17, wherein the first signal is a data signal and the second signal is a clock signal.

29. The method according to claim 17, wherein the first signal and the second signal are data signals.

* * * * *